(12) United States Patent
An

(10) Patent No.: US 7,359,944 B2
(45) Date of Patent: Apr. 15, 2008

(54) METHOD OF PROVIDING DIGITAL ELECTRONIC BOOK

(75) Inventor: Jung Man An, Kunsan-shi (KR)

(73) Assignee: LG Electronics Inc., Seoul (KR)

( * ) Notice: Subject to any disclaimer, the term of this patent is extended or adjusted under 35 U.S.C. 154(b) by 628 days.

(21) Appl. No.: 10/066,763

(22) Filed: Feb. 6, 2002

(65) Prior Publication Data

US 2002/0107759 A1 Aug. 8, 2002

(30) Foreign Application Priority Data

Feb. 7, 2001 (KR) .............................. 10-2001-5985

(51) Int. Cl.
*G06F 15/16* (2006.01)
(52) U.S. Cl. ..................... 709/206; 709/231; 705/14
(58) Field of Classification Search .................. 705/14; 709/206, 231
See application file for complete search history.

(56) References Cited

U.S. PATENT DOCUMENTS

| | | | | |
|---|---|---|---|---|
| 5,848,396 A | * | 12/1998 | Gerace | 705/10 |
| 5,948,061 A | * | 9/1999 | Merriman et al. | 709/219 |
| 6,014,502 A | * | 1/2000 | Moraes | 709/219 |
| 6,298,218 B1 | * | 10/2001 | Lowe et al. | 455/66.1 |
| 6,496,803 B1 | * | 12/2002 | Seet et al. | 705/14 |
| 6,496,804 B2 | * | 12/2002 | McEvoy et al. | 705/14 |
| 6,564,380 B1 | * | 5/2003 | Murphy | 725/86 |
| 6,591,247 B2 | * | 7/2003 | Stern | 705/14 |
| 6,712,701 B1 | * | 3/2004 | Boylan et al. | 463/42 |
| 6,799,326 B2 | * | 9/2004 | Boylan et al. | 725/35 |
| 6,944,585 B1 | * | 9/2005 | Pawson | 703/22 |
| 6,957,041 B2 | * | 10/2005 | Christensen et al. | 455/3.06 |
| 7,051,212 B2 | * | 5/2006 | Ginter et al. | 713/193 |
| 7,057,591 B1 | * | 6/2006 | Hautanen et al. | 345/87 |
| 7,058,685 B1 | * | 6/2006 | van Zee et al. | 709/206 |
| 7,124,090 B1 | * | 10/2006 | Howard et al. | 705/14 |
| 7,124,100 B2 | * | 10/2006 | Pirillo | 705/26 |
| 7,165,039 B2 | * | 1/2007 | Seet et al. | 705/13 |
| 7,188,186 B1 | * | 3/2007 | Meyer et al. | 709/231 |

* cited by examiner

*Primary Examiner*—Andrew Joseph Rudy
(74) *Attorney, Agent, or Firm*—Ked & Associates, LLP

(57) ABSTRACT

Disclosed is a contents-providing service through a communication network and a system thereof and, more particularly, a method of providing a digital electronic book suitable for securing a copyright profit, by transferring a digital electronic book or digital multimedia with an advertisement. The method provides portions of a digital e-book in proportion to the degree that a user views an advertisement. Moreover, the method evaluates the e-book based on a user's acknowledgment responses to the advertisement.

6 Claims, 10 Drawing Sheets

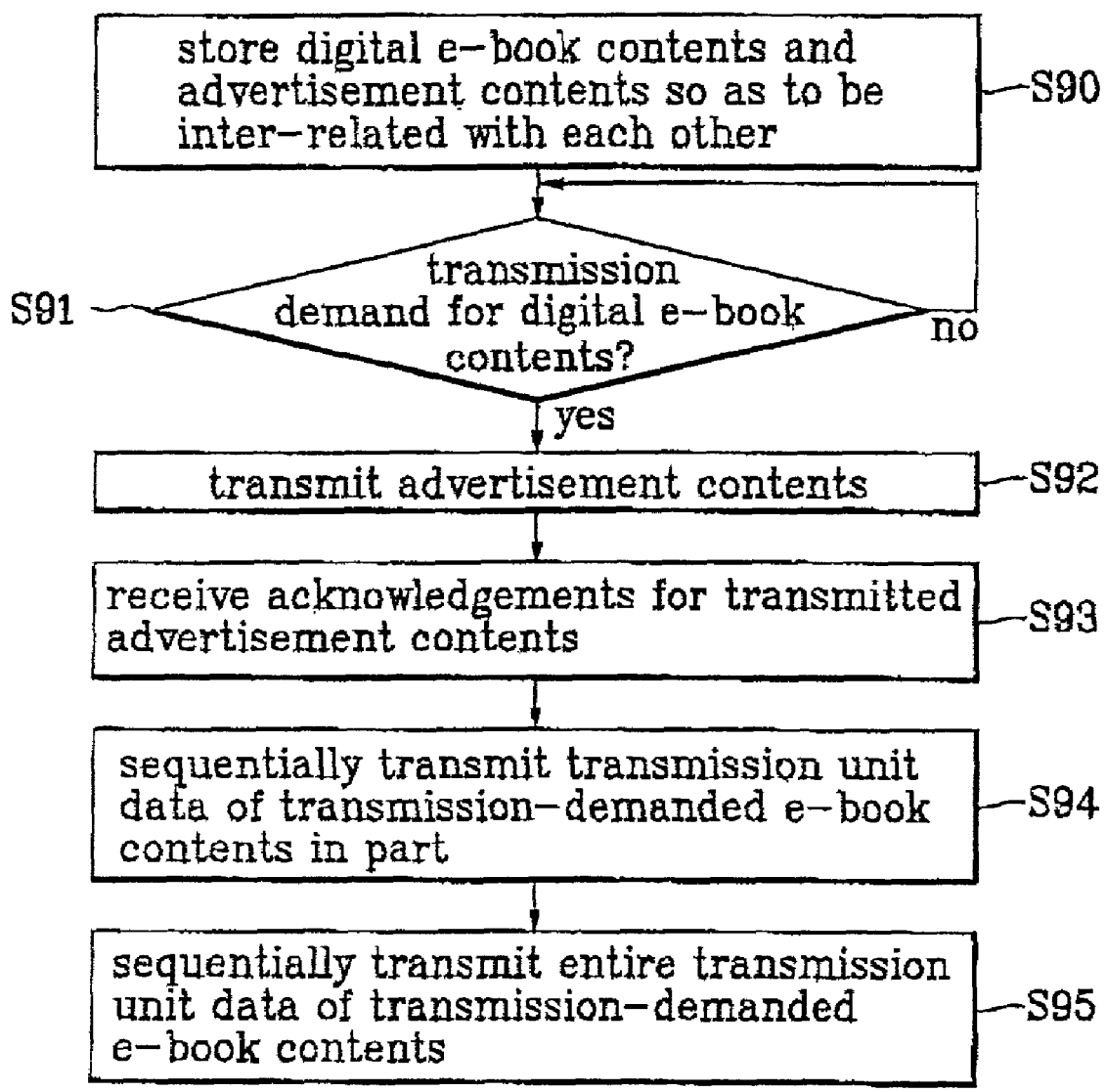

METHOD OF PROVIDING DIGITAL ELECTRONIC BOOK

BACKGROUND OF THE INVENTION

1. Field of the Invention

The present invention relates a contents-providing service through a communication network and a system thereof and, more particularly, to a method of providing a digital electronic book suitable for securing a copyright profit.

2. Background of the Related Art

Computer communication contributes greatly to the global development of mobile communication technology. And, computer communication combined with the technology of the information super-highway leads to the continued expansion of the information technology industry.

Specifically, Internet, having been previously limited to a wired network, is now expanding into a wireless network, of which demand for its service increases day by day. Internet reciprocally connects networks scattered all over the world. At the center of the various networks are information servers. Internet provides all the users of the world information services, without spatiotemporal limitations. Such a design characteristic enables the Internet to increase the number of users, whereby the number of various Internet sites increases to meet the needs of the users.

Most Internet sites provide contents, including the value of predetermined information. Currently, most of the sites provide free contents, while some provide pay-contents. The pay-contents mainly correspond to copyrighted works. In detail, the pay-contents include electronic book (hereinafter abbreviated e-book), multimedia (e.g. music, movie, photo, etc.) and the like.

A process of providing the pay-contents will be explained briefly. First of all, a user connects with a site providing pay-contents through a browser drive of his computer. Namely, the user computer gains access to a server operating the service site. Thereafter, the user is provided with a homepage from the connected site, selects the requested pay-contents through the homepage, and requests a purchase of the pay-contents.

Accordingly, the server carries out 'log-in' for the user and then requests pay settlement for the purchase-demanded pay-contents from the user. If the user approves the pay-settlement for the purchase of the corresponding pay-contents, the server transmits the pay-contents to the user computer. In this case, the user uses a credit card, e-money, or mileage points for the use of the site, and the like for the pay-settlement.

As described above, the payment process for pay-content on the Internet has various disadvantages. As the payment process for the pay-contents on Internet is very complicated and users strongly believe that the information on Internet is supposed to be free, the users are unwilling to use the pay-contents. Therefore, the young generations tend not to use the pay-contents substantially.

Further, when an owner's copyright is protected, such as with an e-book, or when a producer's copyright is protected, such as with multimedia, it is difficult to provide the contents free. In the case of the e-book provided through payment, there is less demand for reading the e-book. Therefore, it is difficult to evaluate works of famous or non-famous writers.

Moreover, the efficiency of advertising provided through Internet sites is reduced. In other words, when an advertiser requests a service provider to post an advertisement, the requested advertisement is usually put on a fixed partial frame of the service site. Therefore, the advertiser cannot easily determine how many users view the advertisement. Thus, conventional advertisement through Internet has a poor efficiency.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, the present invention is directed to a method of providing a digital media that substantially obviates one or more problems due to limitations and disadvantages of the related art.

Another object of the present invention is to provide a method of supplying a digital media that supplies a part of, or the entire contents of, the media in proportion to the degree that a user views an advertisement.

Another object of the present invention is to provide a method of supplying a digital e-book that supplies contents of the digital e-book in proportion to the degree a user views an advertisement and evaluates the digital e-book through an acknowledging response.

To achieve at least the above objects and other advantages in whole or in part and in accordance with purposes of the invention, as embodied and broadly described herein, a method of providing digital contents includes a first step of storing digital contents constructed with a plurality of service unit data and a plurality of advertisement contents and a second step of outputting the stored service unit data and the stored advertisement contents alternately through one transmission path.

Preferably, the first step includes the additional steps of storing a sequence file, indexed to regulate a transmission order for the service unit data of the digital contents, and inter-relating at least one of the advertisement contents to each index of the sequence file, to store the inter-related advertisement contents.

More preferably, when a demand command for information corresponding to a specific index of the sequence file is received during the first step, the method further includes the steps of outputting the advertisement contents of the corresponding index and making the service unit data of the same index stand by for output.

More preferably, the method further includes a step of outputting the service unit data standing by for output, when an acknowledgment for the outputted advertisement contents is received.

More preferably, the method further includes a step of measuring a popularity of the digital contents, by referring to the number of acknowledgments of the advertisement contents outputted together with the service unit data of the digital contents.

More preferably, the method further comprises a step of outputting the service unit data standing by for output if a predetermined time elapses after the output of the advertisement contents.

In another aspect of the present invention, a method of providing a digital electronic book includes a first step of storing a plurality of digital electronic book contents, constructed with a plurality of transmission unit data, respectively, and a plurality of advertisement media; a second step of transmitting at least one of the advertisement media, which is inter-related to the transmission-demanded digital electronic book contents, in the stored advertisement contents when a transmission demand for a specific digital electronic book content is received; and a third step of transmitting a specific transmission unit data of the transmission-demanded digital electronic book content when an advertisement acknowledgment response for the transmitted advertisement media is received.

Preferably, when a transmission demand for a next sequential transmission unit data is received, following the third step, the method further includes a step of transmitting another advertisement media that is inter-related to the transmission-demanded digital electronic book content.

Preferably, the third step includes the additional steps of accumulating the received advertisement responses and measuring a popularity of the transmission-demanded digital electronic book content based on an accumulated value.

Preferably, the method further includes the step of measuring a popularity of each of the digital electronic book contents, by accumulating the acknowledgment responses for the advertisement media transmitted with the respective stored digital electronic book contents, and providing a popularity ranking based on a measured value of the responses.

In a further aspect of the present invention, a method of providing a digital electronic book includes a first step of storing an electronic book constructed with a plurality of pages and a plurality of advertisements; a second step of preparing a sequence file having a structure such that at least one of the advertisements is inserted between the Nth and (N+1)th pages of the electronic book, so as to regulate a transmission order; a third step of, when a transmission of the (N+1)th page is further demanded after the transmission of the Nth page, transmitting at least one of the advertisements, regulated to be between the Nth and (N+1)th pages in the stored advertisements, to a corresponding demanding place and according to the sequence file; and a fourth step of, when an acknowledgment response for the transmitted advertisement is received, transmitting the (N+1)th page to the demanding place.

Preferably, the advertisements, whose numbers correspond to a price of the electronic book, are inserted between the respective pages during the second step.

Preferably, the second step is carried out by preparing the sequence file, regulating the transmission order, so as to have a structure that the number of advertisements inserted is done in accordance with importance of each of the pages constructing the electronic book.

In a further aspect of the present invention, a method of providing a digital electronic book includes a first step of transmitting advertisements, targeted on the basis of user registration information, to a user terminal; a second step of receiving acknowledgment responses for the transmitted advertisements from the user terminal; and a third step of transmitting contents of the previously stored electronic book in proportion to the number of received acknowledgment responses.

Preferably, after the third step, the method further includes a series of repeating transmissions of the respective contents, classified in the electronic book, to a plurality of user terminals and asking the plurality of user terminals to respond to popularity surveys for each of the contents. Thereafter, one of the various contents classified in the electronic book is chosen as a climax, in accordance with a popularity ranking.

Preferably, the contents determined as the climax are transmitted with priority when a transmission of the electronic book is subsequently demanded from a random user terminals.

In a further aspect of the present invention, a method of providing a digital electronic book includes a first step of storing an electronic book constructed with a plurality of chapters; a second step of transmitting a list, in which the chapters constructing the electronic book are arranged in a row, when a transmission of the electronic book is demanded by a specific user terminal; a third step of, when the user terminal demands a transmission of a specific one of the chapters, transmitting a previously stored advertisement to the user terminal in connection with the importance of the demanded chapter; and a fourth step of, when it is judged that the transmitted advertisement is displayed for a predetermined time, transmitting the demanded chapter as digital data.

In a further aspect of the present invention, a method of providing a digital electronic book includes a first step of storing a plurality of digital electronic book contents and a plurality of advertisement media; a second step of, when a demand for transmission of a specific one of the digital electronic book contents is received from a random user terminal, streaming the stored advertisement media to the user terminal; a third step of measuring a streaming time of the advertisement media; and a fourth step of streaming the transmission-demanded digital electronic book content to the user terminal for a time proportional to the measured streaming time.

In a further aspect of the present invention, a method of providing a digital electronic book includes a first step of storing digital electronic book contents, constructed with a plurality of transmission unit data, respectively and a plurality of advertisement contents, wherein the digital electronic book contents are inter-related to the advertisement contents; a second step of transmitting the stored advertisement contents when a random user terminal demands a transmission of the digital electronic book contents; a third step of receiving acknowledgment responses for the transmitted advertisement contents from the user terminal; and a fourth step of, for the transmission-demanded digital electronic book contents, transmitting sequentially the transmission unit data entirely or in part for a time proportional to a number of received acknowledgment responses.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 9 illustrates a flowchart of a process for providing a digital e-book, according to a seventh preferred embodiment of the present invention.

DETAILED DESCRIPTION OF PREFERRED EMBODIMENTS

Figure 1:
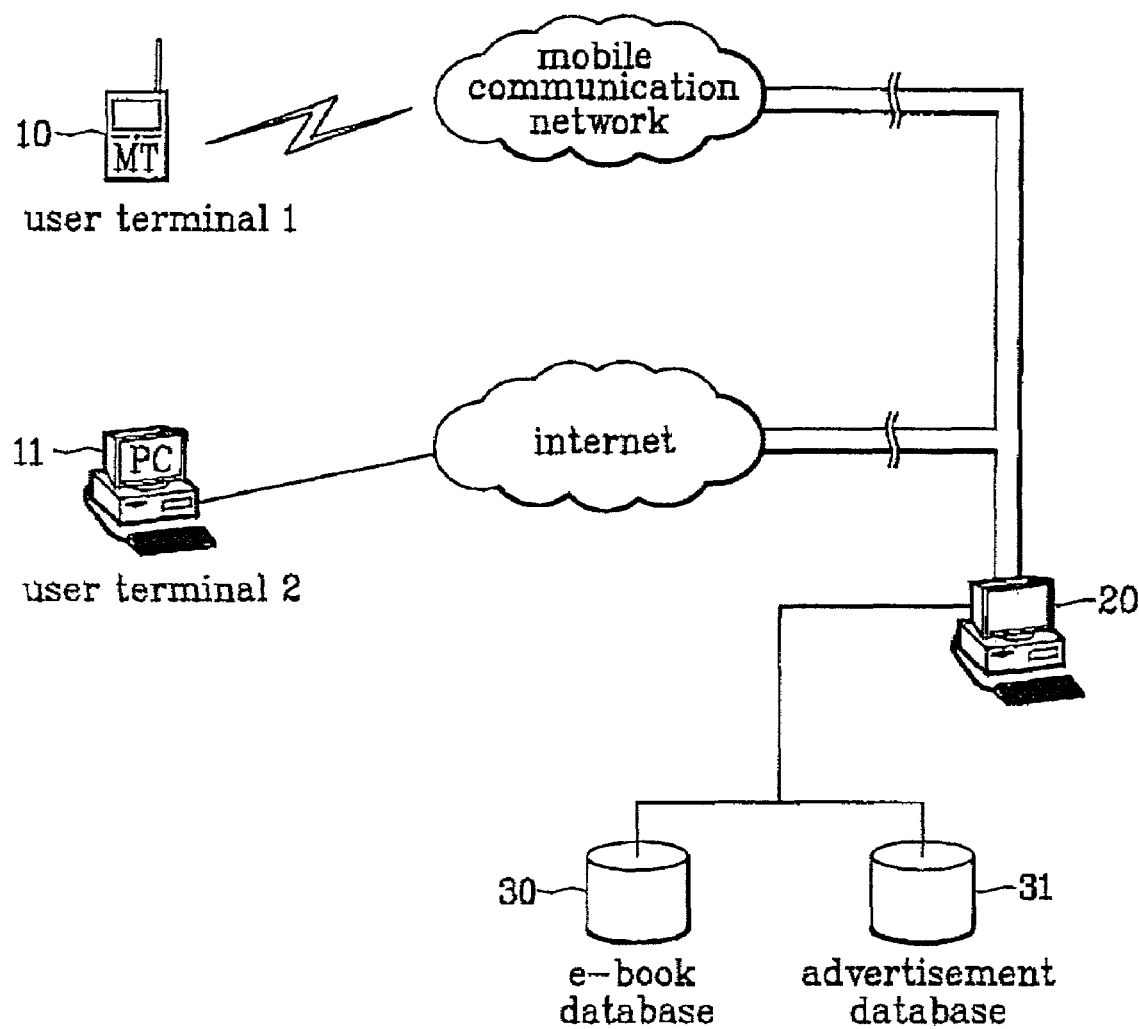
FIG. 1 illustrates a preferred embodiment of a system for providing a digital e-book according to the present invention.

FIG. 1 illustrates a constructional diagram of a preferred embodiment of a system for providing a digital e-book, according to the present invention. The system includes user terminals 10 and 11, a server 20, and databases 30 and 31. The user terminals 10 and 11 are a mobile terminal 10, securing mobility, and a personal computer 11 having a network connection through wired Internet.

User terminals 10 and 11 have built-in browsers suitable for the terminals, respectively, and gain access to the server through the built-in browsers. Specifically, mobile terminal 10 uses wireless Internet technology to gain access to server 20 through a mobile communication network, for which a wireless Internet browser is used. And, personal computer 11 has a built-in standard Internet browser.

Figure 2A:
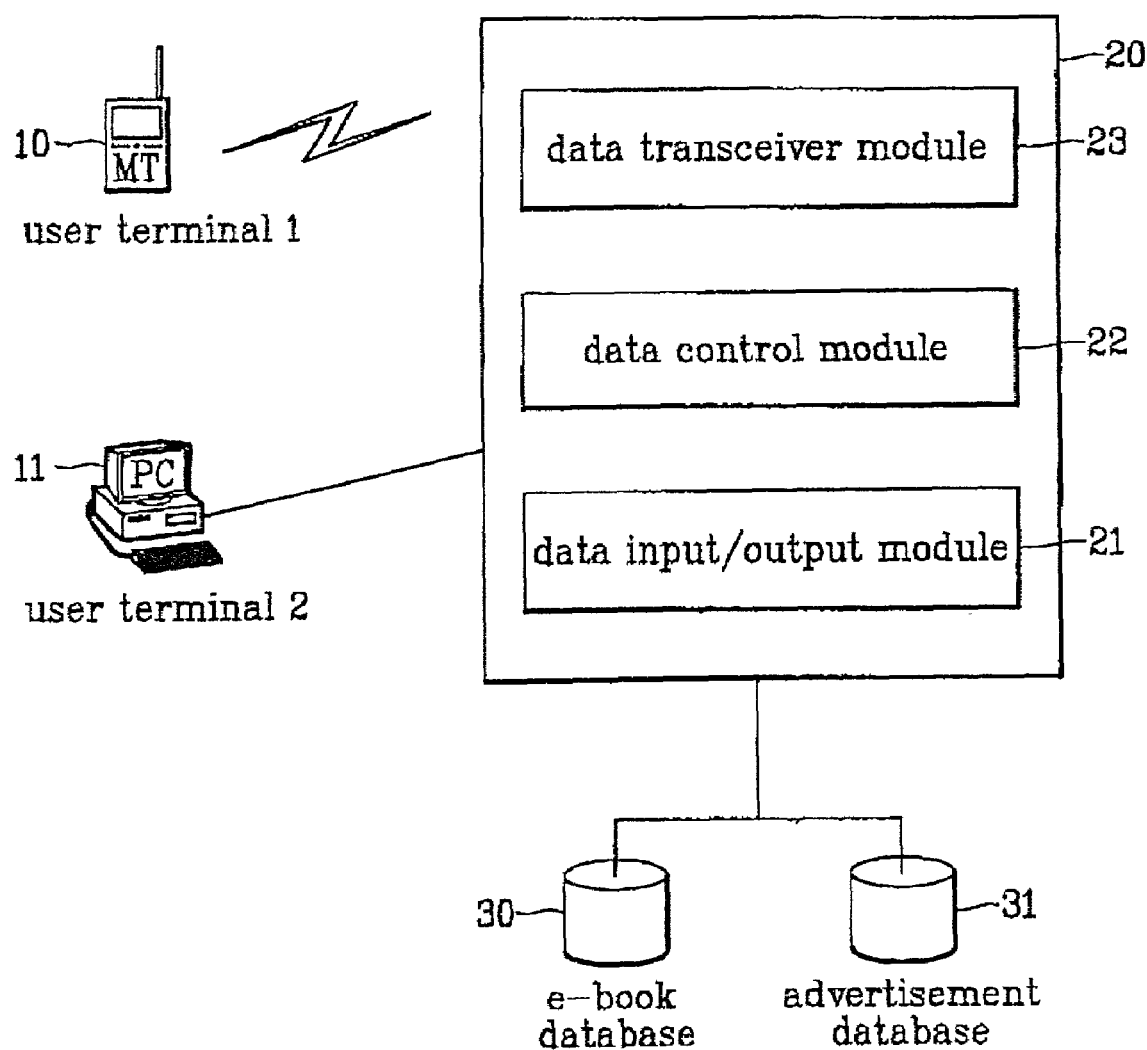
FIGS. 2A and 2B illustrate block diagrams of a preferred embodiment of a server for transmitting a digital e-book, according to the present invention.
Figure 2B:
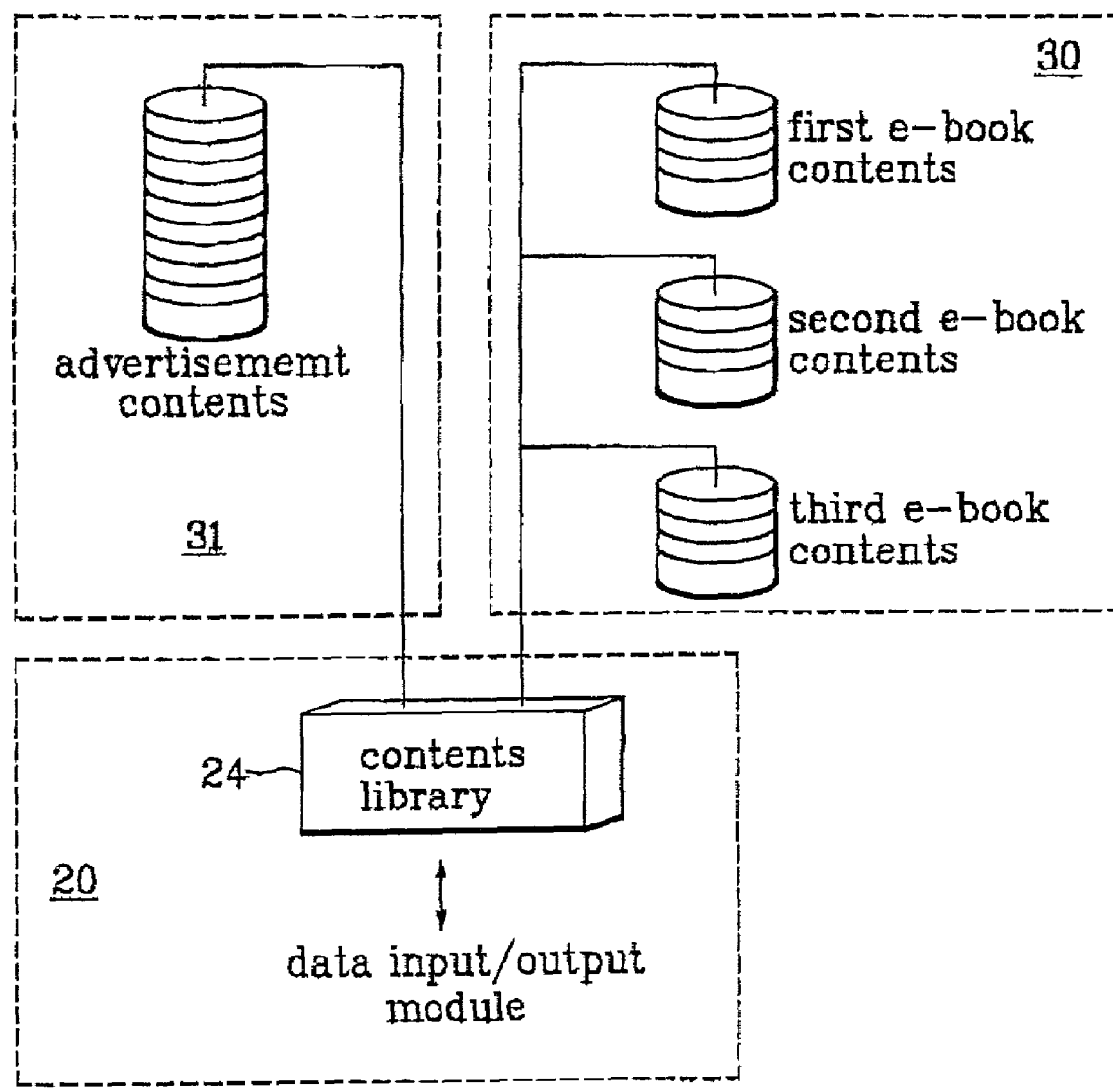

Server 20 preferably has the detailed construction shown in FIG. 2A and FIG. 2B and inter-operates with databases 30 and 31 to provide user terminals 10 and 11 with various digital contents. Specifically, server 20 transmits a digital e-book and advertisement media as digital contents to user terminals 10 and 11. And, the digital e-book and advertisement media are stored in databases 30 and 31, respectively.

E-book database 30 stores a plurality of digital e-book contents. And, each of the digital e-book contents is constructed with a plurality of transmission unit (service unit) data classified according to a data amount that may be transmitted at once through server 20. For server 20 to transmit all of the contents of one digital e-book stored in e-book database 30, each transmission unit data constructing the digital e-book is separately transmitted.

Advertisement database 31 stores a plurality of advertisement contents therein. Specifically, each of the advertisement contents is advertisement media.

The construction and operation of the server according to the present invention are explained in detail as follows.

FIG. 2A and FIG. 2B illustrate detailed block diagrams of a preferred embodiment of a server for transmitting a digital e-book, according to the present invention. Server 20 includes an input/output module 21 controlling the inter-operation with databases 30 and 31, a data control module 22 measuring required data on the basis of the collected information and controlling the data input/output module 21, and a data transceiver module 23 for sending/receiving data to/from user terminals 10 and 11. Additionally, server 20 further includes a contents library 24 constructing each e-book library by data control module 22.

Data input/output module 21, when receiving an extraction command from data control module 22, reads the corresponding data (i.e. transmission unit data of the contents to be extracted or advertisement contents) from databases 30 and 31. Or, when specific data are transferred from the data control module 22 and a write command of the transferred data is transferred, data input/output module 21 writes the transferred data to the database corresponding to the write command. In this case, when an extraction command is transferred from data control module 22, data input/output module 21 extracts the data according to the command and preferably in accordance with sequence files stored in contents library 24. Specifically, contents library 24 inter-relates the advertisement contents to each e-book index of transmission unit data, creating a sequence file to regulate an output order of the inter-related information. The output order is structured so that at least one of the advertisement contents is inserted between each consecutive pair of the transmission unit data constructing each of the e-book contents.

When receiving a command from a specific request place (e.g., user terminal) demanding a specific digital content, data transceiver module 23 transfers the received demand command to data control module 22. Or, when receiving an acknowledgment response ACK from the specific request place acknowledging the previously-provided specific digital content (especially advertisement contents), data transceiver module 23 transfers the received acknowledgment response to data control module 22. Further, when at least one of the transmission unit data is transferred from data control module 22 and a transmission command of the transmission unit data is simultaneously transferred, data transceiver module 23 transmits the transmission unit data to the corresponding request place (e.g., user terminal).

Data control module 22, when receiving a command demanding a specific digital content from data transceiver module 23, transfers the transmission unit data of the requested content and a command for extracting advertisement content to data input/output module 21. Accordingly, when the transmission unit data of the corresponding digital content and advertisement content are transferred from data input/output module 21, data control module 22 conveys the transferred transmission unit data or advertisement content to data transceiver module 23, along with a corresponding transmission control command. In accordance with the control command of data control module 22, data transceiver module 23 transmits the digital e-book content or advertisement content.

Thereafter, when the acknowledgment response ACK for the specific digital content (especially advertisement content) is received from the specific request place (i.e., user terminal) by data transceiver module 23 and relayed to data control module 22, data control module 22 transfers the transmission unit data of the digital e-book content, which is inter-related to the advertisement contents and corresponds to the acknowledgment response ACK, and the transmission command of data to data transceiver module 23. When the acknowledgment responses ACK of the advertisement contents are transferred from data transceiver module 23, data control module 22 measures the popularity of the corresponding digital e-book content by referring to the transferred acknowledgment responses. Preferably the popularity of each of the digital e-book contents is measured by accumulating the transferred acknowledgment responses, and the popularity ranking of the contents is determined by comparing it to advertisement acknowledgment response accumulation values of other various digital e-book contents. And, data control module 22 transfers the determined popularity ranking to the data transceiver module 23 for transmission to the respective user terminals 10 and 11.

Data control module 22 constructs each of the digital e-book contents with various transmission unit data and classifies the digital e-book contents into the transmission unit data so as to be stored in database 30. And, data control module 22 prepares a sequence file having a regulated data transmission order. The transmission order is preferably structured so that at least one of a plurality of advertisement contents is inserted between each consecutive pair of the transmission unit data, thereby forming a library for each e-book. Thus, when an extraction command of the specific digital e-book is transferred from data control module 22, data input/output module 21 extracts the data (i.e., transmission unit data of the contents to be extracted and the advertisement contents inter-related to the index of the transmission unit data) according to the sequence file of the corresponding digital e-book.

When preparing the sequence file for each e-book, digital control module 22 inserts the advertisement content between the transmission unit data. Preferably, the number of advertisements corresponds to the price of the associated e-books. Considering that the transmission unit data forming each of the e-book contents have different kinds of importance, the sequence file is prepared so as to have the structure that the number of advertisements inserted between each consecutive pair of the transmission unit data is varied in accordance with the importance of the respective transmission unit data.

Figure 3:
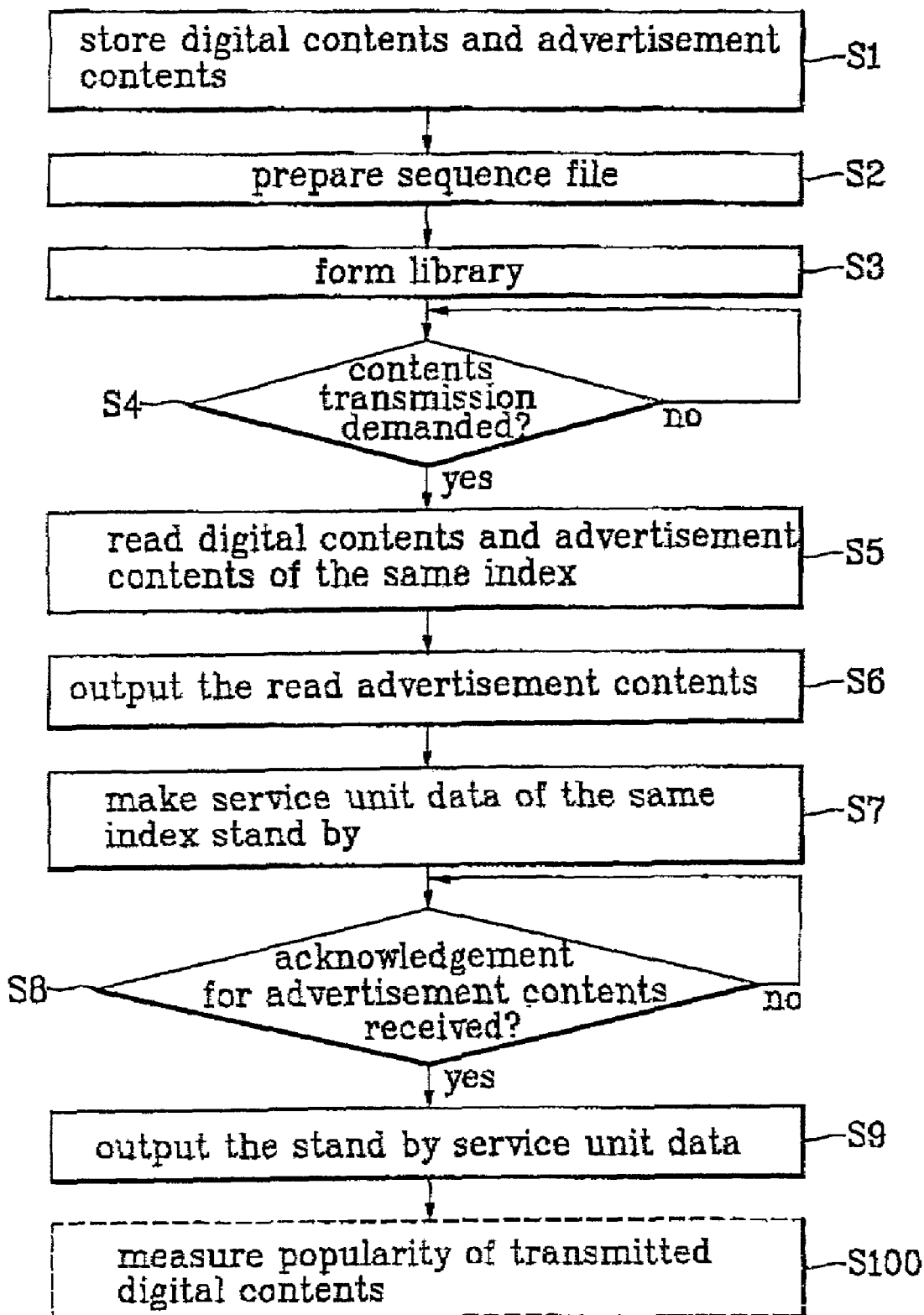
FIG. 3 illustrates a flowchart of a process for providing digital contents, according to a first preferred embodiment of the present invention.

FIG. 3 illustrates a flowchart of a process for providing digital contents, according to a first preferred embodiment of the present invention. Server 20 stores digital contents constructed with a plurality of data comprising service units (i.e., transmission units) and a plurality of advertisement contents in databases 30, 31 (S1). Server 20 develops an index representing a transmission order of each data service unit of the digital contents. Then, server 20 stores within one of databases 30, 31 an indexed sequence file regulating the transmission order, accordingly. Server 20 inter-relates at least one of the advertisement contents to each index item of the prepared sequence file. Preferably server 20 prepares the sequence file having an index item for each data service unit (S2). Moreover, server 20 preferably inter-relates at least one of the advertisement contents to each index item of the prepared sequence file, to form the library regulating the transmission order of the service unit data of the digital contents (S3). Therefore, one index item of the prepared sequence file indicates one data service unit and a storage address within the database storing the at least one advertisement content. Thus, when data input/output module 21 receives an extraction command for one digital content from data control module 22, the index item corresponding to the command is indicated so that one data service unit and at least one of the advertisement contents are outputted from databases 30, 31.

When a transmission demand of the digital content is received from user terminal 10, 11 (S4), server 20 reads one of the data service units of the digital content, stored in the database, and the advertisement content inter-related to the data service unit (S5). When the transmission demand is a request for information corresponding to a specific index item in the sequence file of the digital content, server 20 outputs the corresponding advertisement content of the index item to the user terminal 10, 11 (S6), as well as makes the associated data service unit stand by for transmission (S7).

The user terminal 10, 11 receives the advertisement content and transmits an acknowledgment response ACK, which represents that the received advertisement contents are acknowledged, to server 20. When receiving the acknowledgment response ACK for the advertisement contents (S8), server 20 outputs the transmission-standby data service unit to the user terminal 10, 11 (S9). The service unit data are preferably outputted through the same transmission path as the previously transmitted advertisement content.

Thereafter, server 20 refers to the number of acknowledgment responses ACK of the advertisement contents, related to the digital content, so as to measure a popularity of the digital content (S100). When the advertisement contents transmitted in the above process are an advertisement of which acknowledgment is impossible, server 20 preferably transmits the output-standby data service unit after a predetermined time elapses from the time the advertisement contents are completely transmitted.

The above-explained process of communicating digital contents may be similarly applied to digital e-book contents. Therefore, the above-explained process of FIG. 3 may correspond to a process of providing digital e-book contents.

Figure 4:
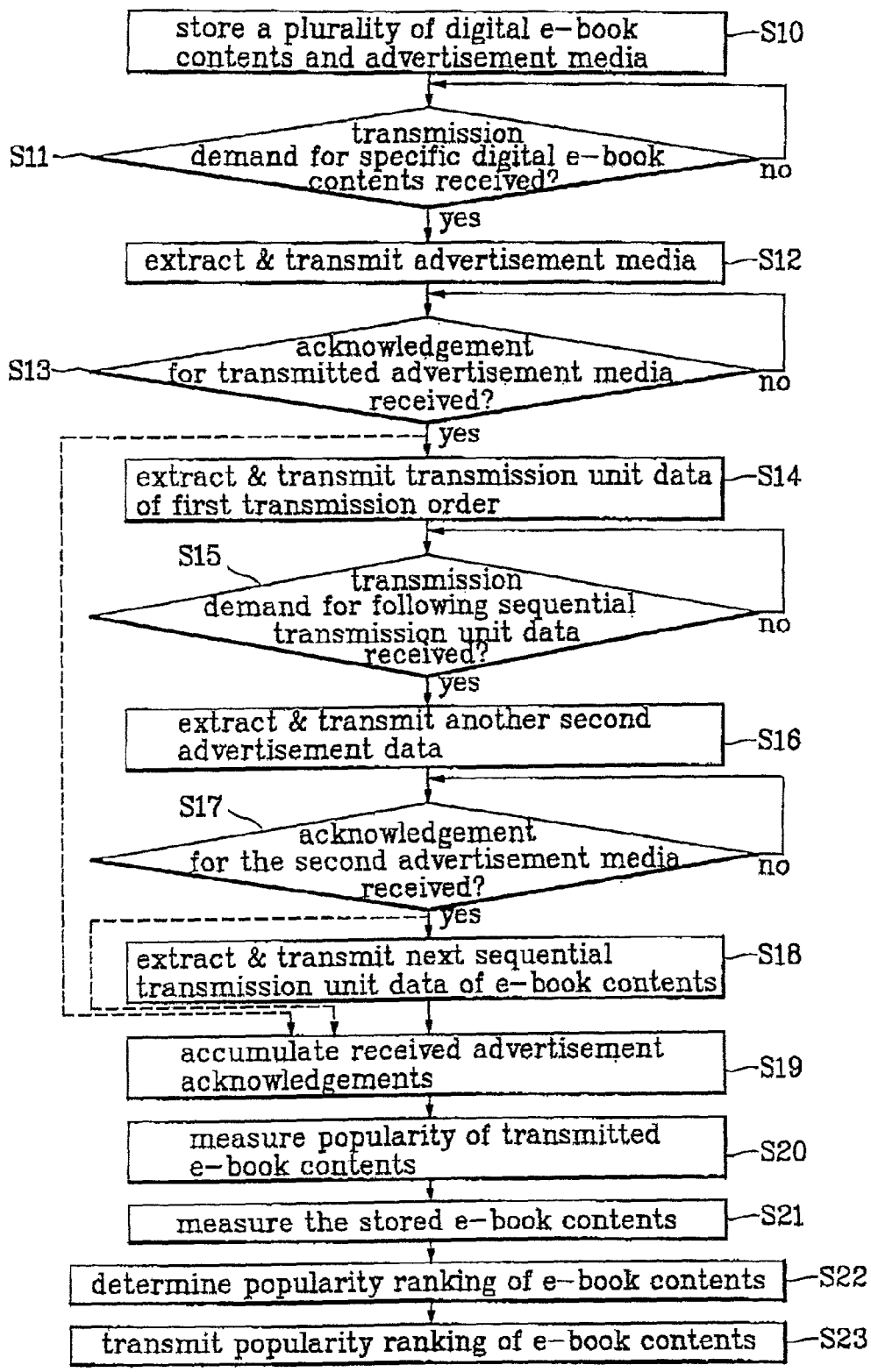
FIG. 4 illustrates a flowchart of a process for providing a digital e-book, according to a second preferred embodiment of the present invention.

FIG. 4 illustrates a flowchart of a process for providing a digital e-book, according to a second preferred embodiment of the present invention. Server 20 stores a plurality of digital e-book contents, each constructed with a plurality of data transmission units respectively, and a plurality of advertisement media in databases 30, 31 (S10). The advertisement media have acknowledgment response ACK paths to server 20. Hence, when a user carries out a specific selection operation, such as a 'click' on the advertisement media transmitted to user terminal 10, 11, the acknowledgment response ACK of the corresponding advertisement media is transmitted to server 20.

Thereafter, when receiving a transmission demand for a specific digital e-book content from the user terminal 10, 11 (S11), server 20 extracts at least one advertisement media, inter-related to the transmission-demanded digital e-book content, from the advertisement media stored in database 31, so as to transmit the extracted advertisement media to the user terminal 10, 11 (S12). When receiving the acknowledgment response ACK for the transmitted advertisement media (S13), server 20 extracts the first transmission unit data, within the predetermined transmission order, of the digital e-book content stored in database 30 for transmission to the user terminal 10, 11 (S14).

And, when receiving a transmission demand for subsequent transmission unit data (S15), server 20 extracts a second advertisement media, inter-related to the transmission-demanded digital e-book content, for transmission to the user terminal 10, 11 (S16). Server 20, when receiving the acknowledgment response ACK from the terminal 10, 11 for the second advertisement media (S17), extracts the next sequential transmission unit data of the requested digital e-book content to transmit to the user terminal 10, 11. Steps S17 and S18 are repeated for each subsequent transmission data unit until the entire e-book is sent (S18).

After transmitting all of the transmission unit data of the requested digital e-book content, through the above steps S11 to S18, server 20 accumulates the advertisement acknowledgment responses ACK received by the above steps (S19). And, server 20 measures a popularity of the digital e-book content based on the accumulated value of the acknowledgment responses (S20).

Thereafter, server 20 carries out the above steps S11 to S20 on various digital e-book contents stored in database 30 and measures the popularity of the respective digital e-book contents (S21). Server 20 then provides the user terminal 10, 11 with a content popularity ranking, determined on the basis of the popularity-measured values of the respective digital e-book contents (S22, S23).

Figure 5:
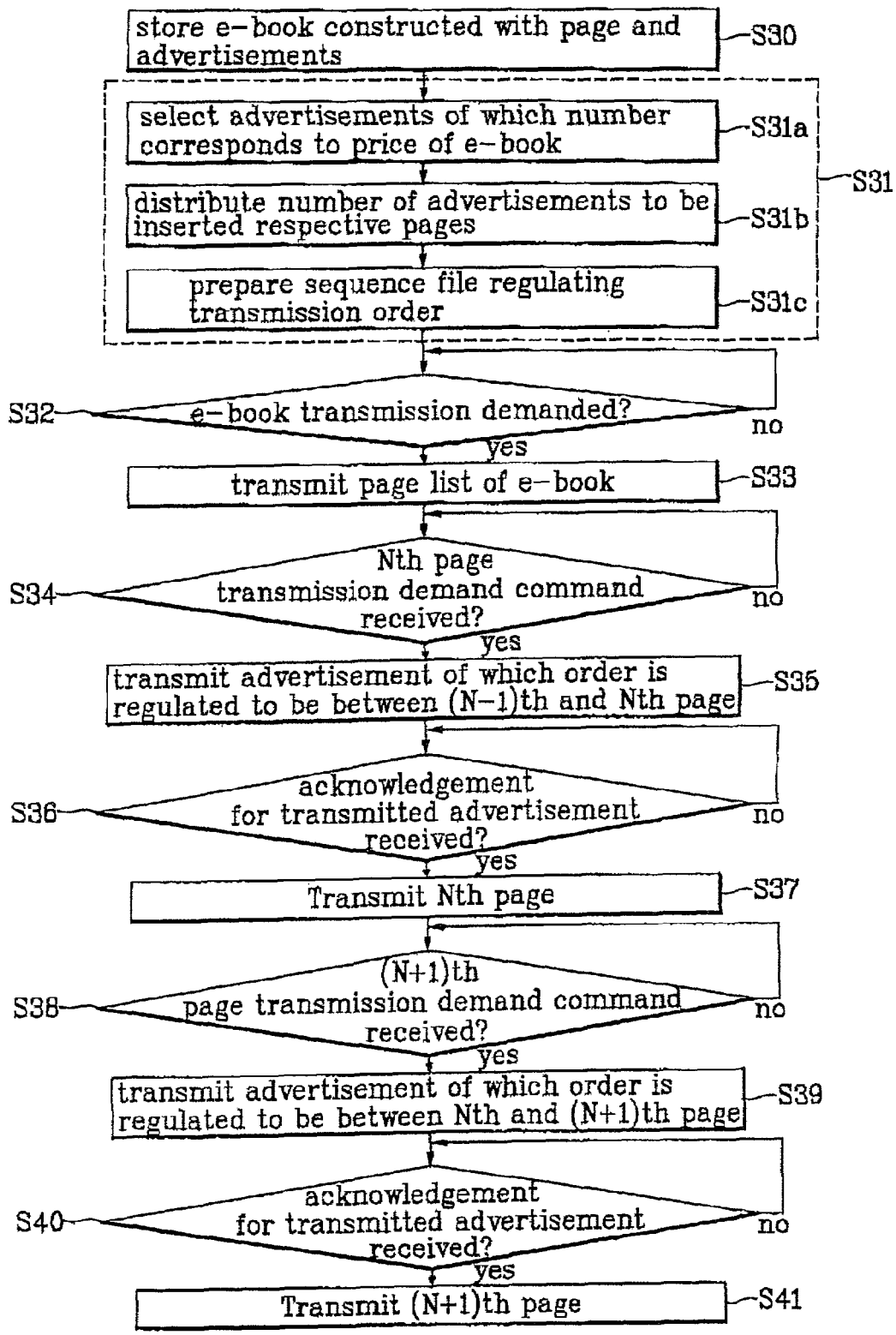
FIG. 5 illustrates a flowchart of a process for providing a digital e-book, according to a third preferred embodiment of the present invention.

FIG. 5 illustrates a flowchart of a process for providing a digital e-book according to a third preferred embodiment of the present invention, in which an e-book includes a plurality of pages and a page unit thereof is the transmission unit (i.e., service unit) used in the foregoing description. Server 20 stores an e-book including a plurality of pages and a plurality of advertisements as digital data in databases 30, 31 (S30).

And, server 20 prepares a sequence file to regulate a transmission order of the transmission units. The transmission order is structured so that at least one advertisement is inserted between every Nth page and (N+1)th page (S31). In this case, the sequence file is prepared so that the total number of advertisements corresponds to a price of the e-book. Preferably, the number of advertisements is selected (S31a), the variable distribution of advertisements between the respective pages is determined (S31b), and the sequence file is prepared for regulating the transmission order, accordingly (S31c).

When a transmission demand for the stored e-book is generated from a user terminal 10, 11 (S32), server 20 transmits a page list of the e-book to the user terminal 10, 11 (S33). When a transmission demand command for the Nth page is received from the user terminal 10, 11 (S34), server 20 transmits at least one advertisement regulated to be between the (N−1)th page and Nth page to the user terminal 10, 11 (S35). When the corresponding acknowledgment response ACK for the transmitted advertisement is received from the user terminal 10, 11 (S36), server 20 transmits the Nth page to the user terminal 10, 11 (S37).

Thereafter, if a transmission of the (N+1)th page is demanded by the user terminal 10, 11 (S38), server 20 transmits the at least one advertisement whose transmission order is regulated to be between the Nth and (N+1)th pages to the user terminal 10, 11 (S39). Upon receiving an acknowledgment response ACK for the transmitted advertisement (S40), server 20 transmits the (N+1)th page to the user terminal 10, 11 (S41).

Figure 6:
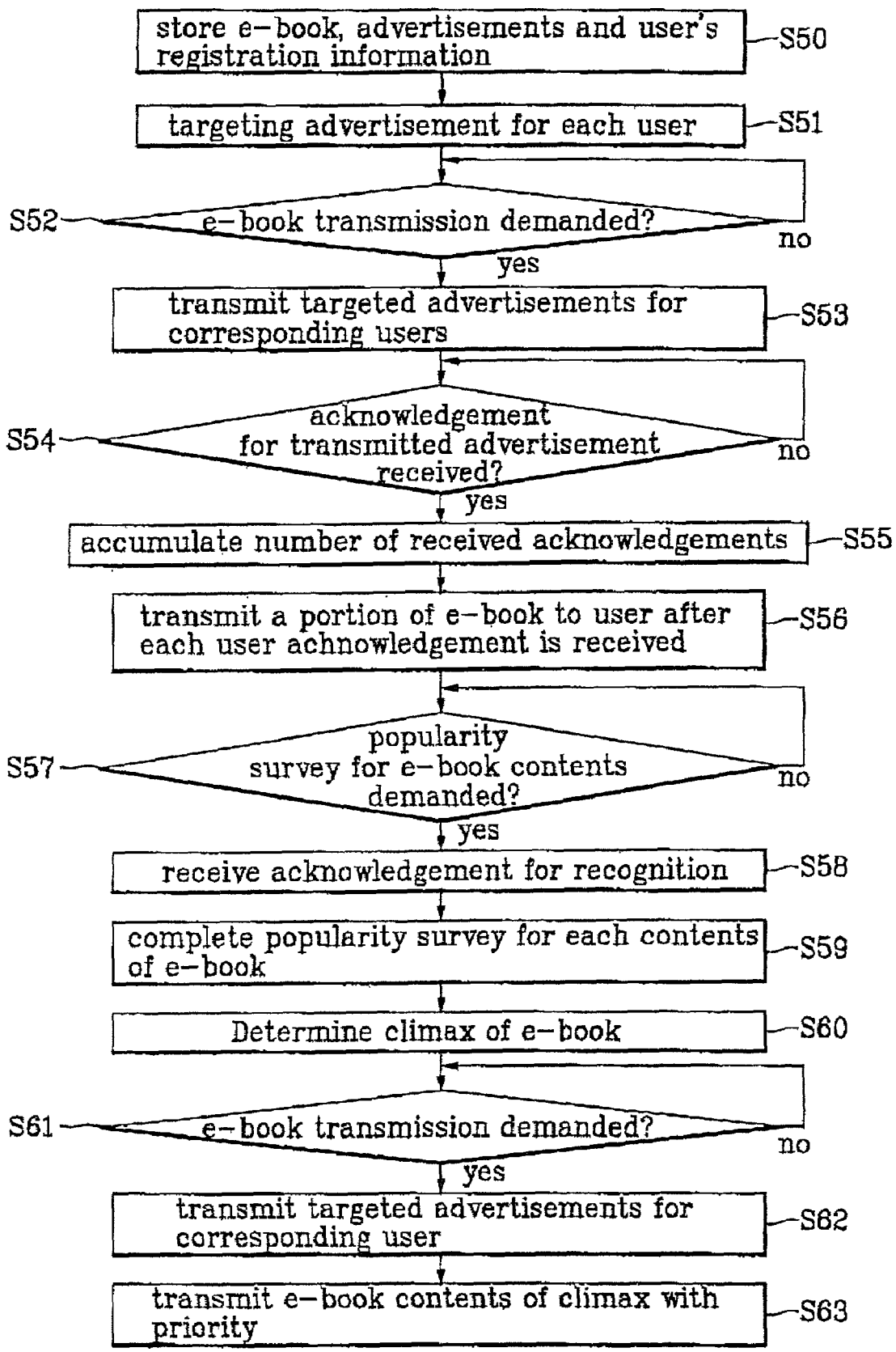
FIG. 6 illustrates a flowchart of a process for providing a digital e-book, according to a fourth preferred embodiment of the present invention.

FIG. 6 illustrates a flowchart of a process for providing a digital e-book, according to a fourth preferred embodiment of the present invention. Server 20 stores an e-book, divided into a plurality of contents and a plurality of advertisements, as digital data in databases 30, 31, as well as registration information of the respective users (S50). Based on the stored user registration information, server 20 carries out targeted advertising for each user (S51).

When a user terminal 10, 11 demands a transmission of the previously stored e-book (S52), server 20 transmits the advertisements targeted for a user of the user terminal 10, 11 (S53). Upon receiving a plurality of acknowledgment responses ACK for the transmitted advertisements from the user terminal 10, 11 (S54), server 20 accumulates the number of received acknowledgment responses ACK (S55).

Server 20 repeatedly transmits an additional portion of the e-book to the user terminal 10, 11, after each ACK is received that is proportionate to the accumulated response number in various classified contents of the previously stored e-book (S56).

For each advertisement acknowledgment response ACK received by server 20, server 20 transmits an additional remaining portion of the e-book to the user terminal 10, 11. Server 20 then conducts a popularity survey of the content transmitted to the user terminal 10, 11 (S57). Thereafter the user's response is transmitted from the user terminal 10, 11 (S58) to server 20. The above steps S52 to S58 are carried out on a plurality of user terminals so that the popularity survey of the e-book is completed (S59). Server 20 then determines one of various contents of the e-book as a climax, in accordance with the popularity of the respective contents received from a plurality of the user terminals 10, 11 (S60).

When a random user terminal subsequently demands a transmission of the e-book, the e-book is transmitted as described previously for all portions but the climax (S61). Then, server 20 transmits the corresponding advertisement preceding the climax portion of the e-book and subsequently transmits the selected climax (S62,S63).

Figure 7:
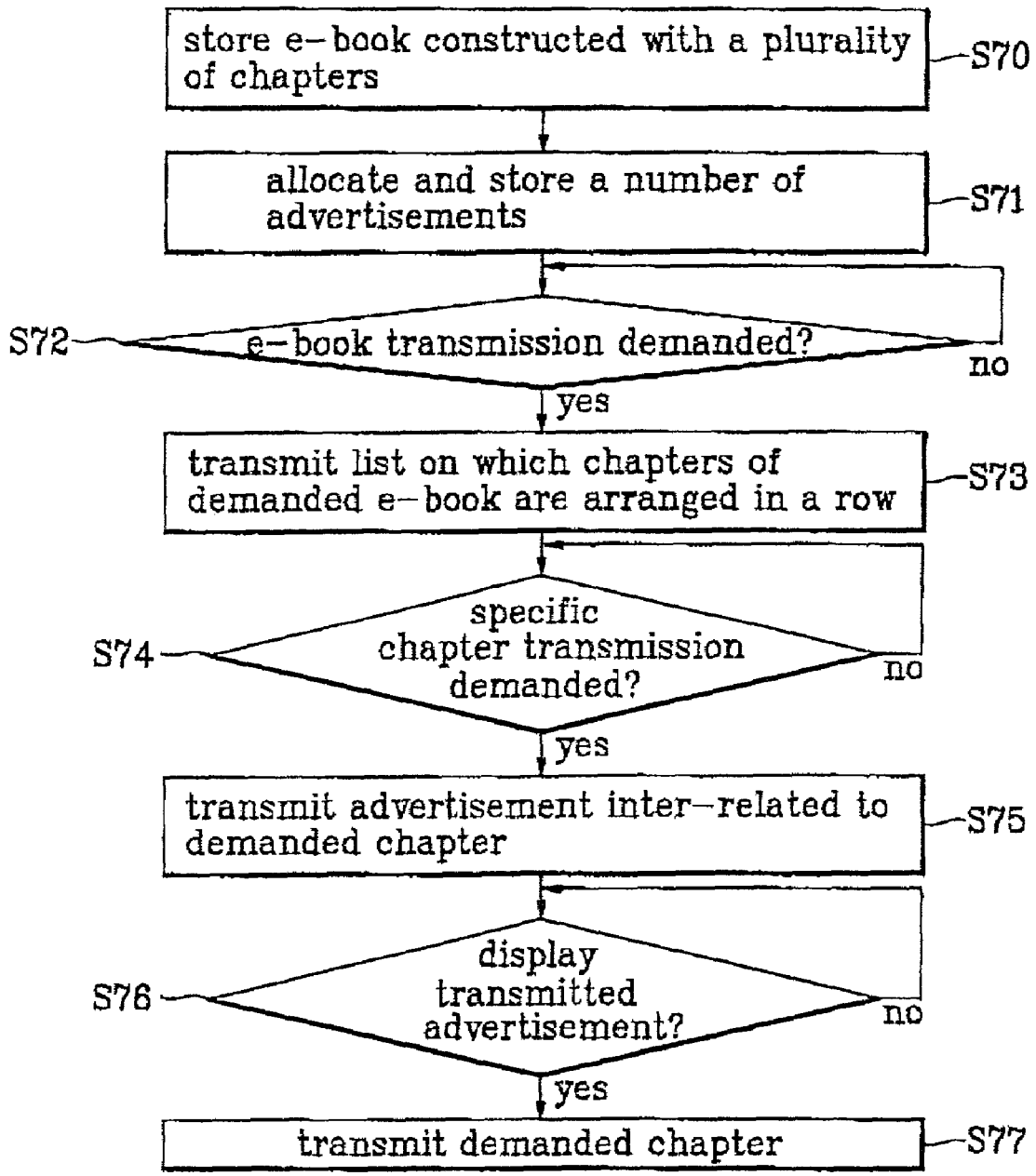
FIG. 7 illustrates a flowchart of a process for providing a digital e-book, according to a fifth preferred embodiment of the present invention.

FIG. 7 illustrates a flowchart of a process for providing a digital e-book, according to a fifth preferred embodiment of the present invention. Server 20 stores an e-book constructed with a plurality of chapters and a plurality of advertisements in databases 30, 31 (S70). Specifically, server 20 allocates the number of advertisements assigned to the respective chapters differently, in accordance with the importance of each of the chapters of the e-book. Server 20 then stores the advertisements according to their assignments (S71). However, if the advertisements have differing rates, server 20 assigns the advertisements in accordance with the importance of the e-book chapters.

When a specific user terminal 10, 11 demands a transmission of the previously stored e-book (S72), server 20 transmits a list identifying the chapters, which are arranged in a row, to the user terminal 10, 11 (S73).

When the user requests transmission of a specific chapter (S74), the previously stored advertisement assigned to the requested chapter is transmitted to the user terminal 10, 11 (S75). After determining that the transmitted advertisement has been displayed on the user terminal 10, 11 for a predetermined time (S76), server 20 transmits the requested chapter to the user terminal 10, 11 as digital data (S77).

Figure 8:
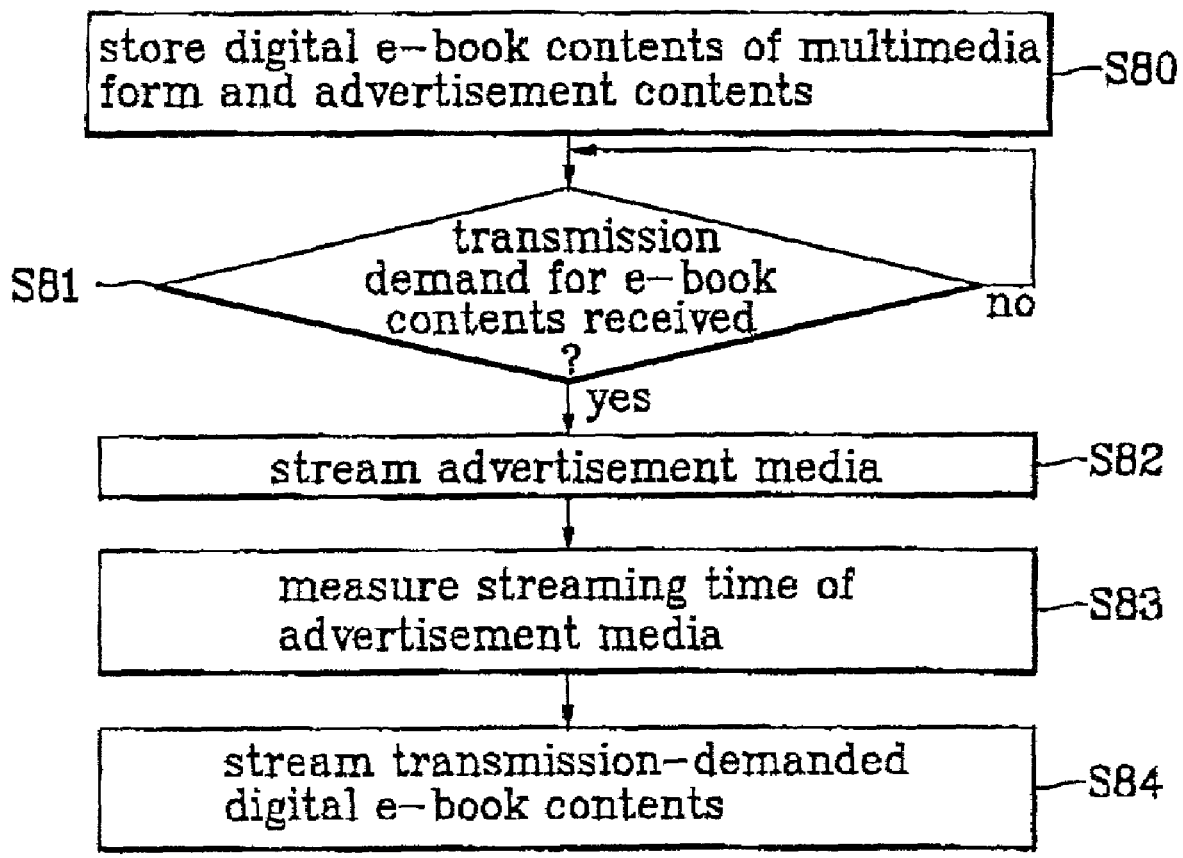
FIG. 8 illustrates a flowchart of a process for providing a digital e-book, according to a sixth preferred embodiment of the present invention.

FIG. 8 illustrates a flowchart of a process for providing a digital e-book, according to a sixth preferred embodiment of the present invention. Here, the digital e-book contents and advertisement media have the characteristic of streamed media.

Server 20 stores a plurality of digital e-book contents, prepared in a multimedia form, and a plurality of advertisement media in databases 30, 31 (S80). Upon receiving a transmission demand for a specific digital e-book content from a random user terminal 10, 11 (S81), server 20 carries out a streaming of the stored advertisement media to the user terminal 10, 11 (S82). Server 20 measures a streaming time of the streamed advertisement media (S83). And, server 20 streams the requested digital e-book content to the user terminal 10, 11 for a time proportionate to the measured streaming time of the advertisement media (S84). Accordingly, a user may view all of the digital e-book content within a time limit that is proportionate to the streaming time of the multimedia.

FIG. 9 illustrates a flowchart of a process for providing a digital e-book, according to a seventh preferred embodiment of the present invention. Server 20 inter-relates digital e-book contents, constructed with a plurality of transmission unit data, with a plurality of media contents and stores the contents (S90).

When a user terminal 10, 11 demands a transmission of a specific digital e-book content (S91), server 20 transmits the stored advertisement contents to the user terminal 10, 11 (S92). And, server 20 receives acknowledgment responses ACK for the transmitted advertisement contents from the user terminal 10, 11 (S93).

Server 20 then, for a time proportionate to the number of acknowledgment responses received from the user terminal 10, 11, sequentially transmits transmission unit data of some portion of the requested digital e-book contents (S94). Or, server 20, for a time proportionate to the number of the received acknowledgment responses, sequentially transmits the entire transmission unit data of the requested e-book content (S95).

Accordingly, the above-described method of providing a digital e-book enables the evaluation (i.e., popularity survey) of the digital e-book through the acknowledgment responses of the transmitted advertisements, thereby supporting an evaluation on works of famous and non-famous writers with ease.

And, the present invention provides the corresponding partial content of the digital e-book without cost, as compensation for viewing the advertisement. The user invests time for viewing the advertisement in exchange for a free digital e-book. Therefore, the present invention expands a user's use of the service. Consequently, the present invention supports a non-pay business of a service provider with ease.

Moreover, the present invention replaces the copyright profits of e-books by advertisement profits, so as to provide users with free e-books. Thus, the preferred embodiments according to the present invention give profit to both the readers and the copyright owners of the e-books. Specifically, the present invention measures whether a user views the advertisement or not, as well as provides the contents of the e-book differentially in proportion to the advertisement viewing. Therefore, the present invention maximizes the advertisement efficiency as well as realizes free e-book provisioning services.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of providing digital contents through a communication network, comprising:
    a first step of storing on a server digital contents each constructed with a plurality of service unit data and a plurality of advertisement contents; and
    a second step of outputting the stored service unit data and the stored advertisement contents alternately through one transmission path via the communication network, wherein the first step further comprises:
        storing a sequence file indexed to regulate a transmission order for the plurality of service unit data of a selected one of the digital contents; and
        inter-relating at least one of the advertisement contents to each index of the sequence file to store the inter-related advertisement contents as the advertisement contents of each service unit data of the selected digital content, wherein when a specific index of the sequence file is requested, and wherein the method further comprises:
            outputting the inter-related advertisement contents of the specific index;
            making the service unit data of the specific index stand by for output;
            outputting the service unit data standing by for output, when an acknowledgment by a user for the outputted advertisement contents of the specific index is received; and
            measuring a popularity of the digital contents by referring to a number of acknowledgments received regarding each of the plurality of advertisement contents that were outputted corresponding to the plurality of service unit data of the digital contents.

2. The method of claim 1, further comprising outputting the service unit data standing by for output after a predetermined time elapses after the output of the advertisement contents of the specific index.

3. The method of claim 1, wherein the first step further comprises:
    storing a transmission order for each of the plurality of service unit data of selected ones of the digital contents; and
    inter-relating at least one of the advertisement contents to said each of the plurality of service unit data of said selected ones of the digital contents according to a content of a corresponding digital content to store the inter-related advertisement contents as the advertisement contents of said each of the plurality of service unit data of said selected ones of the digital contents.

4. The method of claim 1, wherein when a designated service unit data of the digital contents is requested using a specific index of the sequence file, the method further comprises:
    outputting the inter-related advertisement contents of the designated service unit data; and
    outputting the designated service unit data after an acknowledgment by a user for the outputted advertisement contents of the designated service unit data is received, wherein the stored inter-related advertisement contents are determined according to a price of a corresponding digital content or a priority of said each service unit data of the corresponding digital content that together form the corresponding digital content.

5. The method of claim 4, wherein the sequence file has a structure that at least one of the advertisement contents is inserted between each of the plurality of service unit data of the corresponding digital content, and wherein at least one of the outputted service unit data is transmitted is in a prescribed relationship to at least one of the received acknowledgment responses or transmitted entirely or in part for a time proportionate to said at least one of the received acknowledgment responses.

6. The method of claim 5, wherein the plurality of service unit data of the corresponding digital content comprise chapters of a plurality of chapters or a set number of pages divided from pages of an electronic book, wherein the set number of pages is a positive integer N.

* * * * *